(12) United States Patent
Regener et al.

(10) Patent No.: US 7,832,775 B2
(45) Date of Patent: Nov. 16, 2010

(54) BAYONET AIR GUIDE CONNECTOR FOR A TURBOCHARGER

(75) Inventors: Guido Regener, Klein Denkte (DE); Markus Seseke, Wollershausen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 543 days.

(21) Appl. No.: 11/723,166

(22) Filed: Mar. 16, 2007

(65) Prior Publication Data
US 2007/0216161 A1 Sep. 20, 2007

(30) Foreign Application Priority Data
Mar. 17, 2006 (DE) .................. 20 2006 004 407 U

(51) Int. Cl.
*F16L 17/00* (2006.01)
(52) U.S. Cl. .................. 285/377; 285/402; 285/396
(58) Field of Classification Search .................. 285/377, 285/360, 361, 396, 401, 402, 91, 400
See application file for complete search history.

(56) References Cited

U.S. PATENT DOCUMENTS

| | | | | |
|---|---|---|---|---|
| 8,096 A | * | 5/1851 | Osgood | 285/377 |
| 259,501 A | * | 6/1882 | Converse | 285/292.1 |
| 270,323 A | * | 1/1883 | Mann | 285/148.19 |
| 284,146 A | * | 8/1883 | Russell et al. | 285/292.1 |
| 557,019 A | * | 3/1896 | Precourt | 285/362 |
| 761,643 A | * | 6/1904 | Backman | 285/331 |
| 2,377,740 A | | 6/1945 | Alford | |
| 4,330,140 A | * | 5/1982 | Hampton | 285/39 |
| 4,856,581 A | * | 8/1989 | Santoro | 165/130 |
| 4,858,960 A | * | 8/1989 | Pharaon | 285/91 |
| 5,667,251 A | * | 9/1997 | Prest | 285/12 |
| 5,855,399 A | | 1/1999 | Profunser | |
| 6,052,995 A | * | 4/2000 | Krimmer et al. | 60/611 |
| 6,168,212 B1 | * | 1/2001 | Finley | 285/377 |
| 6,244,632 B1 | * | 6/2001 | Gasparini | 285/401 |
| 7,017,953 B2 | * | 3/2006 | Benscoter et al. | 285/401 |
| 2005/0121912 A1 | * | 6/2005 | Benscoter et al. | 285/401 |

FOREIGN PATENT DOCUMENTS

| | | |
|---|---|---|
| EP | 0 750 152 B1 | 12/1996 |
| EP | 1 213 472 A | 6/2002 |
| GB | 785 310 A | 10/1957 |
| WO | WO 02/02982 | 1/2002 |

\* cited by examiner

Primary Examiner—Aaron Dunwoody

(57) ABSTRACT

A connection for connecting tubular air guide element to a turbocharger includes a tubular nipple having a connection end provided with first set of locking element and an air guide element having a connection end provided with a second set of locking elements. A bayonet ring having locking elements is received over the connection ends and forms a bayonet coupling, coupling the tubular nipple and air guide element in a sealed manner.

14 Claims, 4 Drawing Sheets

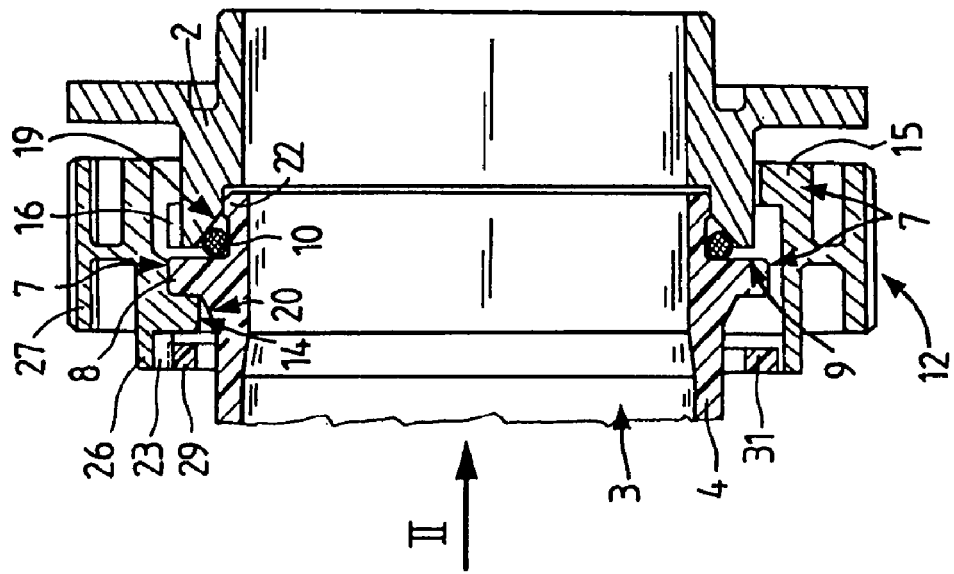
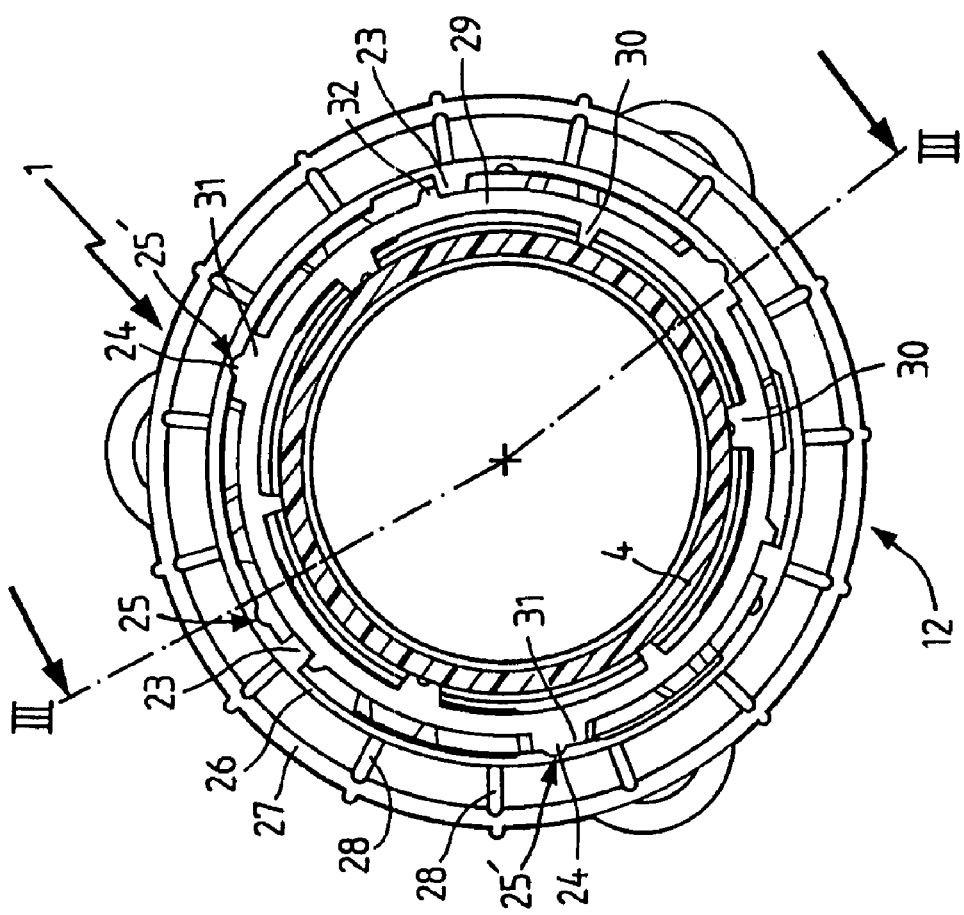

BAYONET AIR GUIDE CONNECTOR FOR A TURBOCHARGER

BACKGROUND OF THE INVENTION

This invention relates to a connector for connecting a tubular air duct or conduit to a turbocharger.

Profusner, U.S. Pat. No. 5,855,399 (=EP 750,152) discloses a plug-in connection, which is intended for joining pipelines and hose lines and is designed in particular for use in duct systems of motor vehicles. This plug-in connection comprises an inner sleeve and an outer sleeve, both of which accommodate a pipeline or hose line between them so that a pipe socket may be pushed over the outer sleeve and can be snap locked with the outer sleeve with the aid of securing means. The securing means consists of a wire hoop. Therefore, the outer periphery of the pipe socket exhibits at least one radial bulge, which extends in the longitudinal direction; and in the area of the bulge the pipe socket exhibits in the circumferential direction an aperture, through which a part of the wire bow engages. The bulge is associated with a projection, which is located on the outer sleeve and with which the wire bow interacts.

SUMMARY OF THE INVENTION

It is an object of the invention to provide an improved connector for connecting a tubular air conduit to a connecting pipe.

Another object of the invention is to provide a connector for connecting an air conduit to a connecting pipe which can be assembled or connected in a simple fashion.

A further object of the invention is to provide a connector which is especially adapted for connecting an air conduit to a turbocharger of an internal combustion engine.

These and other objects are achieved in accordance with the present invention by providing a connection for connecting tubular air guide element to a turbocharger, the turbocharger having a tubular nipple which is disposed on a housing of the turbocharger and to which an end of the air guide element is to be connected in a sealed manner, wherein the tubular nipple and the air guide element are provided adjacent their respective ends which are to be connected with a locking element comprising integral projections which form at least one bayonet coupling.

The connector of the invention is simple to construct and easy to assemble, and, in addition, the necessary plug-in length is short. Due to the relative rotation of the two parts to be connected, a only a small mounting force is required in order to achieve a high clamping force.

In accordance with a preferred embodiment of the invention, the bayonet coupling is formed by a locking element, which advantageously comprises at least two radial engaging members that are distributed around the circumference of the pipe nipple and the air guide element and extend as segments over a curved section of the respective circumference. In order to realize the bayonet coupling, it is particularly advantageous to provide a bayonet ring which is secured to the tubular nipple of the turbocharger by a first bayonet coupling and is connected to the air guide element by a second bayonet coupling. In this way it is possible to arrange the segments for the bayonet coupling to the tubular nipple of the turbocharger and to the air guide element in each case on the outer peripheral surface, which is more advantageous for manufacturing the parts. The respective mating parts for the first and the second bayonet couplings are arranged on the inner circumference of the bayonet ring. Thus, the segments on the tubular nipple and the air guide element are oriented to project radially outwardly; and the segments on the bayonet ring are oriented to project radially inwardly.

In another embodiment of the invention, a sealing ring is arranged between the tubular nipple and the air guide element. When the bayonet coupling is assembled, this sealing ring exerts an axial biasing force. Thus, not only is the sealing function achieved, but also the components are held in such a manner with respect to each other that there is no play. It is advantageous to clamp the sealing ring between a conically expanding inner surface of the tubular nipple and a radial collar adjoining a cylindrical nozzle of the air guide element.

The air guide element is preferably a blown pipe made of synthetic resin material (i.e., plastic) on which the locking element, i.e., the radially extending segments are formed directly from the material of the pipe. The bayonet ring is preferably a high strength injection molded part. To facilitate simple positioning in a defined position, it is advantageous to provide stop abutment elements on the segments and/or the bayonet ring, which stop abutment elements limit the angle of rotation when the bayonet couplings are assembled. In addition, it is advantageous to provide latching elements or detents on the bayonet ring and the air guide element to hold the bayonet ring in the assembled state.

In a further embodiment, a guide element, preferably in the form of an O-ring, may be arranged at the front end of the pipe. In this way transmission of vibrations between the front end of the pipe and the tubular nipple of the turbocharger also may be avoided or at least largely damped. In addition, it is advantageous for both the first and the second bayonet coupling to comprise the same number of pairs of segments which form the bayonet couplings. The arrangement of three or four pairs of segments is viewed as particularly suitable.

BRIEF DESCRIPTION OF THE DRAWINGS

The invention will be described in further detail hereinafter with reference to illustrative preferred embodiments shown in the accompanying drawing figures, in which:

FIG. 2 is a sectional view taken transversely to the longitudinal axis of an air guide element looking in the direction of the bayonet ring;

FIG. 3 is a sectional view taken along the line III-III of FIG. 2;

DETAILED DESCRIPTION OF PREFERRED EMBODIMENTS

Figure 1:
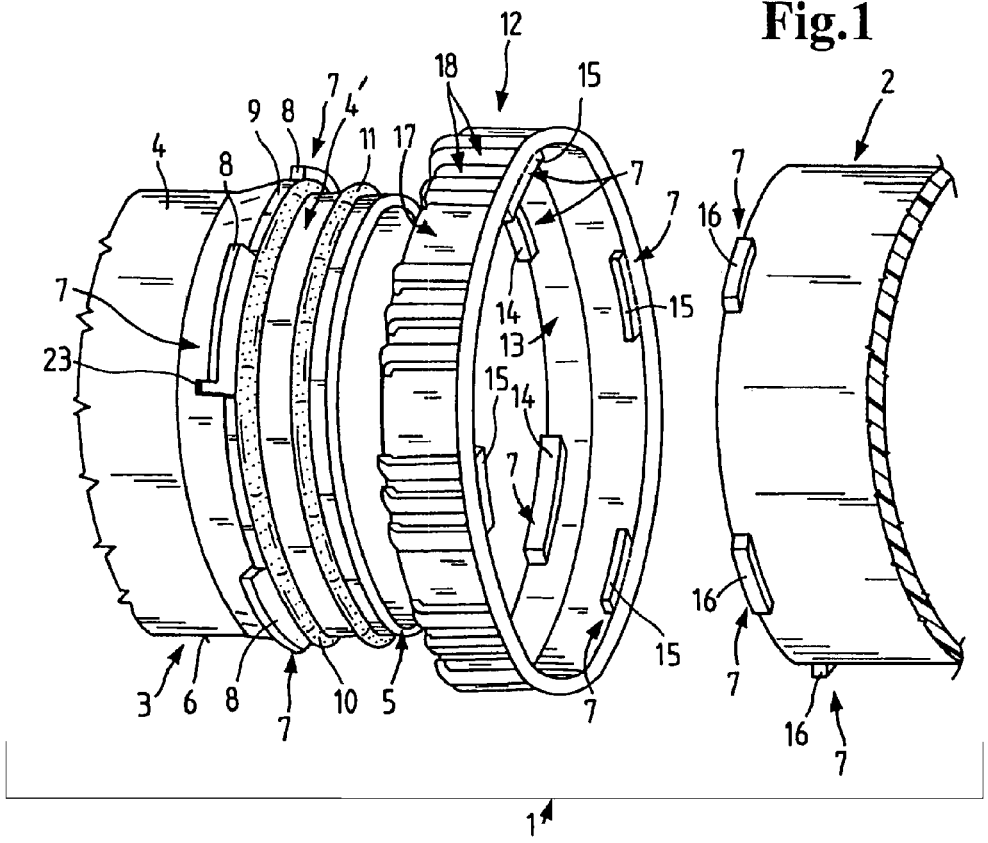
FIG. 1 is an exploded representation of a connector for a tubular air guide element according to the present invention.

FIG. 1 shows a connection 1 comprising a tubular nipple 2, which is disposed on a housing of a turbocharger (which is not illustrated), and an air guide element 3. In the embodiment of FIG. 1, the air guide element 3 is comprised of a pipe 4, which is made of synthetic resin material and is manufactured preferably by a blow molding process. Locking elements 7 are provided on outer surface 6 of the pipe 4 spaced a predetermined distance from the front end 5 of the pipe, which in the illustrated embodiment extend as first segments 8 over a curved section of the respective circumference. These segments 8 thus constitute radially outwardly projecting engaging members, which cooperate with radially inwardly projecting second segments 14 on an inner wall 13 of a bayonet ring 12 to form a bayonet coupling.

In addition, the inner wall 13 of the bayonet ring 12 exhibits third segments 15, which also project radially inwardly and are provided in order to cooperate with fourth segments 16 on the front end of the tubular nipple 2 to form a further bayonet coupling. All of the segments 8, 14, 15, 16 together form the locking element 7, which is provided for connecting the air guide element 3 to the tubular nipple 2. As can be seen from the drawing of the bayonet ring 12, the respective arrangements of the second segments 14 and the third segments 15 are offset relative to each other around the periphery so that a more uniform distribution of force in the bayonet ring 12 is achieved.

In the immediate vicinity of the first segments 8, the pipe 4 has a radial collar 9, which is adjoined by a section 4' of reduced diameter that extends to the front end 5 of the pipe 4. On the section 4' is mounted a sealing ring 10 in the form of an O-ring, which rests against the radial collar 9. This sealing ring 10 is provided in order to interact with a counterpart surface on the tubular nipple 2. At the front end 5 of the pipe 4 there is another O-ring 11, which facilitates the insertion of the front end 5 into the tubular nipple 2 and serves additionally to damp the transmission of vibrations between the assembled parts.

The outer periphery 17 of the bayonet ring 12 is provided with axially extending ribs 18, which serve to facilitate gripping by an assembler during the installation of the bayonet ring, i.e., during production of the bayonet coupling. In order to produce the bayonet coupling, the first step is to push the bayonet ring 12 onto the pipe 4. At the same time the second segments 14 assume an angular position, in which they may be pushed axially through the spaces between the first segments 8 onto the outer surface 6 of the pipe 4. Then, by rotating the bayonet ring 12 in relation to the pipe 4, the second segments 14 move behind the first segments 8. In so doing, the maximum angle of rotation is limited by the stop abutment element 23 on the first segment 8. Then the front end 5 of the pipe 4 is introduced into the tubular nipple 2, and in particular until the seal 10 rests against a mating counterpart surface of the tubular nipple 2. By suitable axial pressure of the pipe 4 in the direction of the tubular nipple 2 and by rotating the arrangement, formed by pipe 4 and bayonet ring 12, the third segments 15 are moved behind the fourth segments 16, with the result that an axial clamping occurs during the rotating process due to the contour of the segments 15 and 16.

FIG. 2 is a sectional view of the pipe 4 transversely to the longitudinal axis looking in the direction of the bayonet ring 12. In FIG. 2 the shapes on the bayonet ring 12 are somewhat modified, and there are also additional elements, however the principles of construction of this arrangement are comparable to the configuration in FIG. 1. A concentric ring 29, which is linked to the material of the pipe via legs 30, is formed on the pipe 4. The concentric ring 29 exhibits three radial projections 31, which are staggered by 120° and on each of which a respective detent 24 is provided. In the drawing in FIG. 2, these detents 24 engage in locking notches 25' on an inner ring 26 of the bayonet ring 12. The bayonet ring 12 also comprises an outer ring 27, which is connected to the inner ring 26 by a plurality of legs 28. The inner ring 26 has three radially inwardly directed stop abutment elements 23, which serve to limit the angle of rotation through which the bayonet ring 12 may be rotated relative to the pipe 4. In the vicinity of the stop abutment element 23 there is another locking notch 25, in which the detent 24 engages, when the bayonet ring 12 is moved into the position in which the projection 31 rests against the stop abutment element 23, as shown in FIG. 4.

FIG. 3 is a sectional view taken along the line III-III of FIG. 2. This drawing shows the tubular nipple 2 with the adjoining air guide element 3 and the bayonet ring 12. The air guide element 3 comprises the pipe 4, which is produced preferably by the blow molding method and on which the concentric ring 29 is formed by way of legs 30. In the lower region of FIG. 3 one can see the projection 31 on the concentric ring 29. In the upper region of FIG. 3 one can see the stop abutment element 23, which projects radially inwardly from the inner ring 26. The inner ring 26, the outer ring 27 and the legs 28, which connect the inner and outer rings together, (cf. FIG. 2) form the bayonet ring 12. On the end facing the pipe 4, the bayonet ring 12 has radially inwardly extending second segments 14, which engage the radially outwardly extending first segments 8 on the pipe 4. On the end facing the tubular nipple 2, the bayonet ring 12 has the radially inwardly extending third segments 15, which, like the other segments, also form the locking element 7. The outer circumference of the tubular nipple 2 carries the fourth segments 16, which together with the third segments 15 form the first bayonet coupling 21.

The first segments 8 and the second segments 14 together form a second bayonet coupling 20. The side of the first segments 8 that faces the tubular nipple 2 has a radial collar 9, in front of which is located a cylindrical nozzle 22. A sealing ring 10, which rests against the radial collar 9, is mounted on the cylindrical nozzle 22. The tubular nipple 2 has a conically expanding inner surface 19, against which the sealing ring 10 is clamped. The arrow II matches the view shown in FIG. 2.

Figure 4:
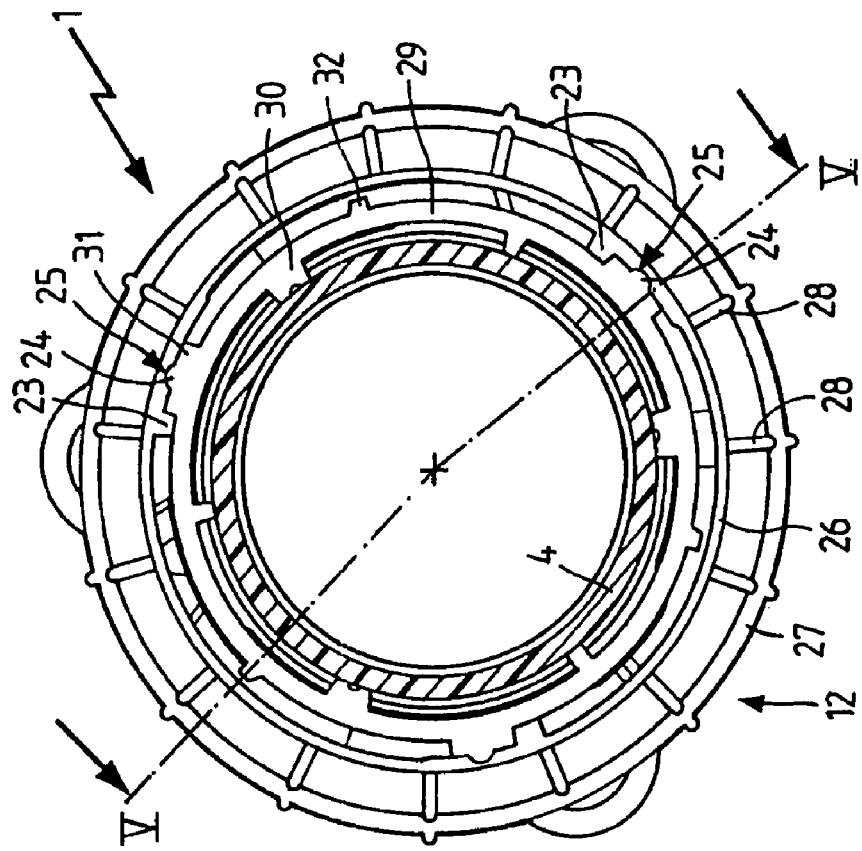
FIG. 4 is a representation, according to FIG. 2, in the position of the bayonet ring, in which the connecting device is completely mounted.

FIG. 4 is a drawing similar to FIG. 2. However, in FIG. 4 the bayonet ring 12 is rotated in relation to the pipe 4 and its concentric ring 29. It can be seen from this drawing that the projection 31 lies against the stop abutment element 23; and in this position the detent 24 engages in the locking notch 25. Due to the interengagement of the detent 24 with the locking notch 25, the bayonet ring 12 is secured in its position in relation to the pipe 4. All other reference numerals correspond to those used for the same parts in FIG. 2, so that reference is made here to the respective description of the parts in FIG. 2.

Figure 5:
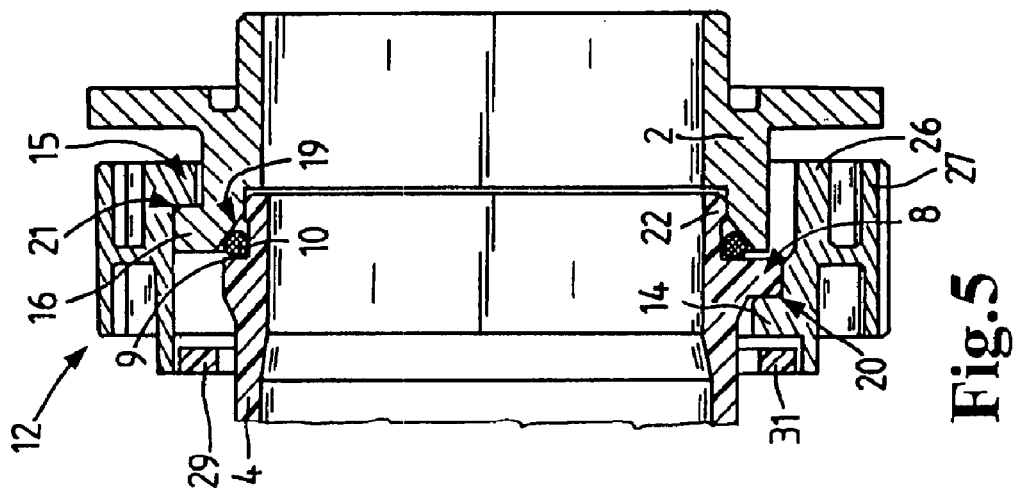
FIG. 5 is a sectional view taken along the line V-V of FIG. 4.

FIG. 5 is a sectional view taken along line V-V of FIG. 4. This drawing shows a connection that is completely assembled. That is, both the first bayonet coupling 20 and the second bayonet coupling 21 are in the totally locked position. The locking element 7 is formed, on the one hand, by the first segments 8 and the second segments 14 and, on the other hand, by the third segments 15 and the fourth segments 16. Since the bayonet ring 12 straddles both the fist segments 8 and the fourth segments 16, and it engages with the second segments 14 and the third segments 15, the pipe 4 is held against the tubular nipple 2 under the prestress generated by compression of the sealing ring 10. Also, the reference numerals used in FIG. 5 correspond to those used to identify the same parts in FIG. 3.

Figure 6:
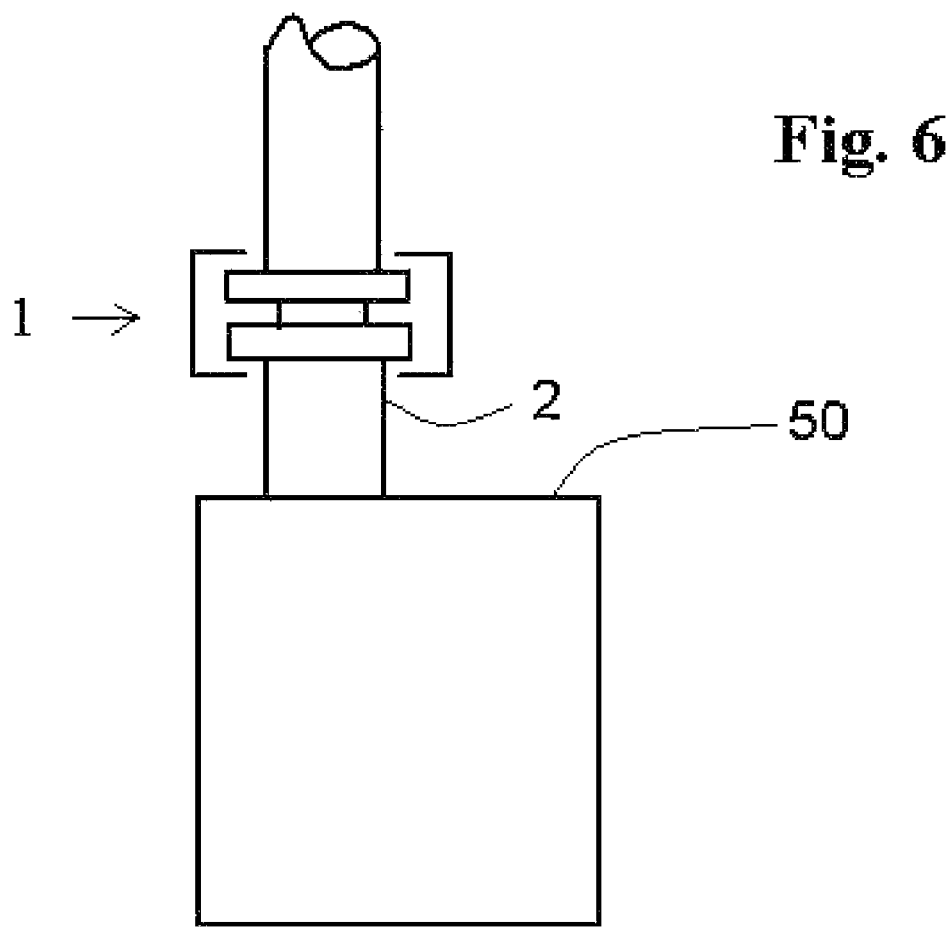
FIG. 6 is a schematic representation, of a connection connecting a tubular air duct to a turbocharger consistent with the present invention.

FIG. 6 presents a schematic representation of a connection 1 comprising a tubular nipple 2 disposed on the housing 50 of a turbocharger.

Whereas in the embodiment in FIG. 1, each of the bayonet couplings, distributed around the circumference, comprises four pairs of segments, in the embodiment shown in FIGS. 2 to 5, three segment pairs are provided for each bayonet coupling.

The foregoing description and examples have been set forth merely to illustrate the invention and are not intended to be limiting. Since modifications of the described embodi-

What is claimed is:

1. A connection connecting a tubular air guide element to a turbocharger, the connection comprising:
   a tubular nipple which is disposed on a housing of the turbocharger, said tubular nipple having a first connection end;
   said air guide element having a connection end, said air guide element connection end configured and adapted to form a sealed connection with said first connection end of said tubular nipple;
   a locking element comprising integral projections which form at least one bayonet coupling to couple said connection ends; and
   at least one set of cooperating latch elements configured to lockably hold the bayonet coupling in an assembled position;
   wherein said air guide element is sealably connected to said turbocharger by said connection;
   wherein said latch elements comprise
      a concentric ring encircling around and spaced apart from an outside surface of one of the connection ends, said concentric ring supported on said connecting end by a plurality of legs extending between said concentric ring and said outside surface of said one of said connection ends;
      at least one radially outwardly extending radial projection arranged on said concentric ring, said radially outwardly extending projections include a further outwardly extending detent tab;
      at least one locking notch arranged on said bayonet ring, said locking notches sized and configured to engage with said detent tabs to lock said bayonet connection in said assembled position; and
      wherein said detent tabs and locking notches form said latch elements.

2. A connection according to claim 1, wherein the locking element comprises
   at least two radial engaging members;
   wherein a first portion of said radial engaging members are distributed around a circumference of the tubular nipple and extend as segments over a curved section of the circumference, said first portion of said radially engaging members secured to an outside surface of said tubular nipple;
   wherein a second portion of said radial engaging members are distributed around a circumference of the air guide element and extend as segments over a curved section of the air guide element, said second portion of said radially engaging members secured to an outside surface of said air guide element.

3. A connection according to claim 2, further comprising a bayonet ring secured to the tubular nipple of the turbocharger by first bayonet coupling and to the air guide element by a second bayonet coupling.

4. A connection according to claim 2, wherein the air guide element is a blow-molded duct made of synthetic resin material, and the locking elements are integrally formed directly on the outer surface of the duct.

5. A connection according to claim 4, further comprising a guide element arranged at the end of the air guide element.

6. A connection according to claim 5, wherein said guide element comprises an O-ring.

7. A connection according to claim 3, wherein
   said radially engaging members of the air guide element and the tubular nipple each have radially outwardly projecting segments, and
   wherein the bayonet ring has radially inwardly projecting segments which engage the radially outwardly projecting segments to form the bayonet couplings.

8. A connection according to claim 3, wherein the bayonet ring is an injection molded synthetic resin part.

9. A connection according to claim 3, wherein the at least one of the segments or the bayonet ring is provided with a stop abutment which limits the angle of rotation of the bayonet ring relative to the tubular nipple or the air guide element.

10. A connection according to claim 3, wherein said first and second bayonet couplings each comprise four pairs of radially extending segments.

11. A connection according to claim 3, wherein said first and second bayonet couplings each comprise three pairs of radially extending segments.

12. A connection according to claim 7, wherein said latch elements comprise:
   a concentric ring encircling around and spaced apart from an outside surface of one of the connection ends, said concentric ring supported on said connecting end by a plurality of legs extending between said concentric ring and said outside surface of said one of said connection ends;
   at least one radially outwardly extending radial projection arranged on said concentric ring, said radially outwardly extending projections include a further outwardly extending detent tab;
   at least one locking notch arranged on said bayonet ring, said locking notches sized and configured to engage with said detent tabs to lock said bayonet connection in said assembled position;
   wherein said detent tabs and locking notches form said latch elements.

13. A connection according to claim 1, further comprising
   a sealing ring disposed between the tubular nipple and the air guide element,
   wherein said sealing ring is compressed between the tubular nipple and the air guide element to exert an axial prestress when the connection is assembled.

14. A connection according to claim 13, wherein the sealing ring is clamped between a conically expanding inner surface of the tubular nipple and a radial collar of the air guide element.

* * * * *